(12) United States Patent
Nguyen et al.

(10) Patent No.: US 8,396,305 B2
(45) Date of Patent: Mar. 12, 2013

(54) IMAGE COMPRESSION UTILIZING RING-TREE ENTROPY CODING AND DIRECTIONAL TRANSFORMS

(75) Inventors: Thai-Ha Nguyen, San Jose, CA (US); Ali Tabatabai, Cupertino, CA (US)

(73) Assignee: Sony Corporation, Tokyo (JP)

( * ) Notice: Subject to any disclaimer, the term of this patent is extended or adjusted under 35 U.S.C. 154(b) by 217 days.

(21) Appl. No.: 12/833,831

(22) Filed: Jul. 9, 2010

(65) Prior Publication Data

US 2012/0008870 A1    Jan. 12, 2012

(51) Int. Cl.
*G06K 9/36* (2006.01)
(52) U.S. Cl. ........................................ 382/232
(58) Field of Classification Search .................. None
See application file for complete search history.

(56) References Cited

U.S. PATENT DOCUMENTS

| | | | | |
|---|---|---|---|---|
| 5,159,453 | A * | 10/1992 | Dhein et al. | 348/598 |
| 7,236,639 | B2 | 6/2007 | Jang | |
| 7,565,020 | B2 * | 7/2009 | Wu et al. | 382/238 |
| 2008/0310512 | A1 | 12/2008 | Ye et al. | |
| 2009/0034624 | A1 * | 2/2009 | Bar-On | 375/240.19 |
| 2010/0092082 | A1 * | 4/2010 | Hirakawa et al. | 382/167 |

FOREIGN PATENT DOCUMENTS

EP    0 892 557 A1    1/1999

OTHER PUBLICATIONS

Do, M.N. et al.—"The Contoulet Transform: An Efficient Directional Multiresolution Image Representation"—IEEE Transactions on Image Processing, vol. 14, No. 12, 2005, pp. 2091-2106.
Said, A. et al.—"A New Fast and Efficient Image Codec Based on Set Partitioning in Hierarchical Trees"—IEEE Transactions on Circuits and Systems for Video Technology, vol. 6, Jun. 1996, pp. 1-16.
Oliver, J. et al.—"Design Options on the Development of a New Tree-Based Wavelet Image Coder"—Lecture Notes in Computer Science, vol. 2489, 2003, pp. 252-259.
Vetrivelan, P. et al.—"Wavelet Based Contourlet Transform for Image Compression"—Proc. of the Int. Conf. on Cognition and Recognition, IEEE, 2005, pp. 915-919.

* cited by examiner

*Primary Examiner* — Samir Ahmed
(74) *Attorney, Agent, or Firm* — John P. O'Banion

(57) ABSTRACT

Image encoding for changing representation of zero coefficient clustering and for utilizing a novel directional transform for exploiting the directional properties of image energy. The apparatus and methods can be applied to numerous applications, such as within image codecs. A ring-tree method is taught for representing the grouping of zero transform coefficients as ring-trees into a new symbol for more efficiently coding images. Directional transforms are taught which provide enhanced energy compactness of coefficients, and which capture directional energy resulting in generating enhanced visual quality.

8 Claims, 19 Drawing Sheets

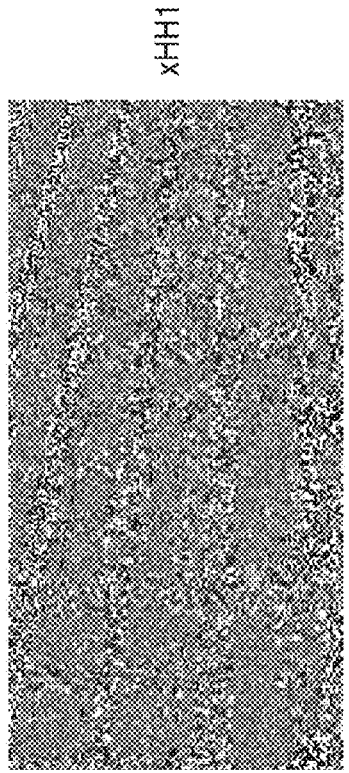
FIG. 18B
FIG. 18C
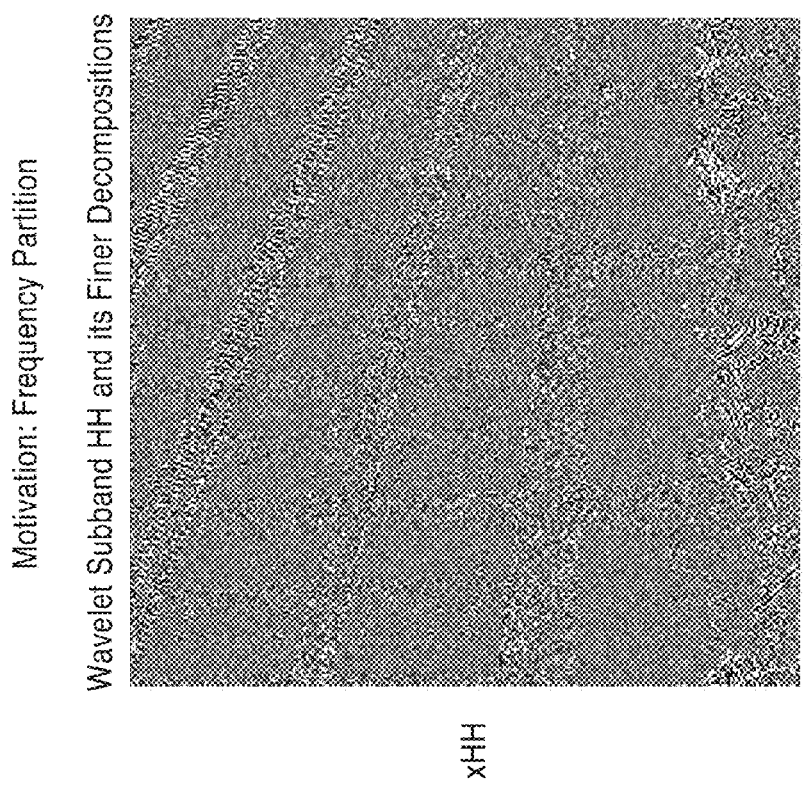
FIG. 18A

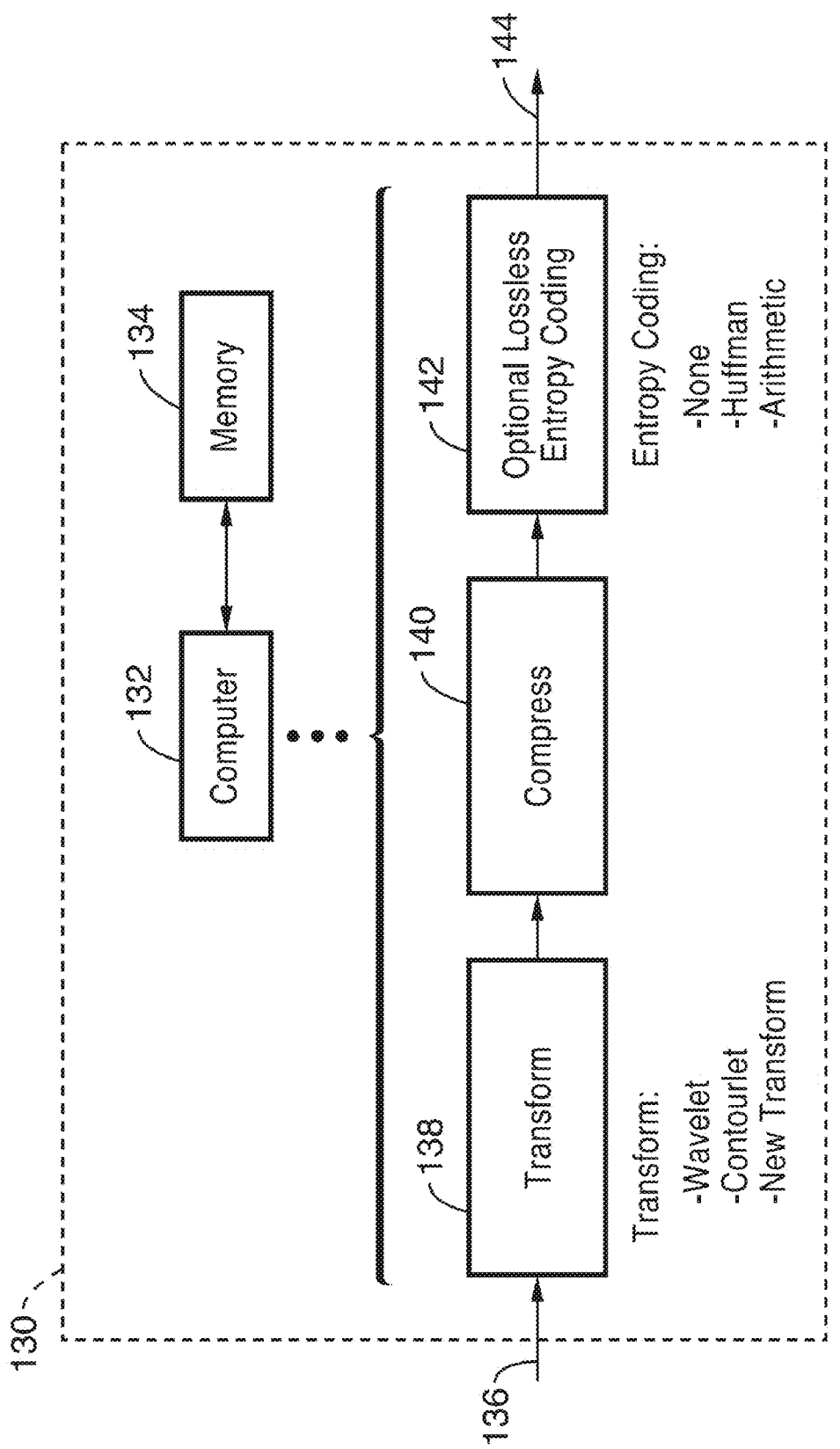

IMAGE COMPRESSION UTILIZING RING-TREE ENTROPY CODING AND DIRECTIONAL TRANSFORMS

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to image coding, and more particularly to image coding using directional transforms and forms of entropy encoding.

2. Description of Related Art

Visual communication remains an important focus of high technology development. To communicate visual information with ever-increasing resolution (definition) over limited bandwidth resources requires finding improved image compression techniques. Increasingly efficient representations of the image data are sought, whereby significant information about the object of interest can be captured within the smallest amount of data possible.

Structured transforms (e.g., block based transforms) and wavelets have been used toward increasing compression efficiency. It will be appreciated that many codecs utilize vector quantization. International standards, including video compression MPEG-1, MPEG-2, MPEG-4, H.261 and H.263 all use a combination of the block Discrete Cosine Transform (DCT) and motion estimation/compensation. In addition, image coding standards, including JPEG and JPEG2000 utilize block-based DCT (JPEG), or wavelet and zero-trees (JPEG2000). Certain newer codecs utilize wavelet transform based image compression in response to a Discrete Wavelet Transform (DWT). However, wavelets provide limited directional ability for capturing image edges.

One of the more important forms of encoding is that of embedded encoding. Embedded coding may be defined in regard to two files being produced by an embedded encoder having files sizes of M and N bits, with M>N, whereby the file with size N is identical to the first N bits of the file with size M. The above is a limited definition, as embedded encoding generally allows a single file to be encoded for users having different quality needs, and in which only the necessary bits are either communicated and/or utilized according to the needed quality level.

FIG. 1 illustrates encoding flow for Embedded Zero-Tree Wavelet (EZW) encoding. An original image is transformed and coded according to embedded zero-tree wavelet (EZW) encoding which generates a dominant list and subordinate list, to which arithmetic coding is applied to output a coded bit stream. In performing embedded encoding, the coding is performed bit-plane by bit-plane, from the most significant bits down to the least significant. Typically, significant coefficients are replaced with zeros to mark them as being already-coded. Two types of output sequence lists are generated using EZW encoding: (1) dominant and (2) subordinate. The dominant list codes the significant map or location of significant coefficients into multiple symbols. By way of example and not limitation, a sequence of four symbols is output (1) "N"—negative significant coefficients; (2) "P"—positive significant coefficients; (3) "Z"—isolated zeros; and (4) "T"—zero-trees. In subordinate lists the magnitude of significant coefficients is encoded as an output sequence of 0s and 1s. In similar manner, encoding has also been performed using Set Partitioning in Hierarchical Trees (SPIHT), which generally provides improved performance over the EZW approach.

Often so called "separable" transforms have been utilized for realizing multiresolution image (embedded) representations. In these approaches 1D filters are used separately. Contrasted to the above are "nonseparable" transforms which utilize 2D filters and 2D downsampling matrices that cannot be factorized into 1D filters and downsampling pairs. The traditional wavelet transform (WT) is categorized as a separable transform, yet it provides limited diagonal selectivity as frequencies which represent different orientation are gathered into one subband in each resolution and are often truncated leading to image blur in diagonal orientations. Embedded encoding is successful because of the tree structure provided by the wavelet transform, which is applied in a separable manner for image coding.

Embedded Zerotree Wavelet (EZW) coding and Set Partitioning in Hierarchical Trees (SPIHT), have attempted to provide computationally simple techniques for image compression.

Contourlet transforms extend beyond 1D wavelets, into true 2D transforms that can capture intrinsic geometric structure. In this approach discrete domain multiresolution and multidirectional expansion is achieved utilizing contour segments and non-separable filter banks.

However, even these advanced techniques have shortcomings when encoding certain image forms, such as those containing directional energy.

Accordingly, a need exists for a system and method of enhancing image coding efficiency within embedded encoders. These needs and others are met within the present invention, which overcomes the deficiencies of previously developed embedded encoding apparatus and methods.

BRIEF SUMMARY OF THE INVENTION

Apparatus and method for image encoding are described for changing how zero coefficients are clustered and for utilizing a novel directional transform (diamond transform) for exploiting the directional properties of image energy. The teachings may be applied within any apparatus providing image coding, such as within image codecs. The term "image", as used throughout, refers without limitation to an image as based on a still image, as well as to an image within a video image stream.

A ring-tree method is taught for grouping zero transform coefficients in response to the use of a new symbol to efficiently code images in an embedded fashion. Test results illustrate that the technique is competitive with existing methods when coding non-directional energy, while providing improved performance on images which display strong directional energy.

In the present invention 2D filtering is used in innovative ways to create more compact set of transform coefficients. Using 2D filtering, a new directional transform is taught, referred to herein as the "diamond transform", which is based on a recognition that the frequency response of most images is diamond-shaped, so that an increasingly compact set of coefficients can be obtained by making use of directional properties of wavelet subbands. The directional diamond transform provides enhanced energy compactness of coefficients, with an ability to capture directional energy resulting in generating enhanced visual quality.

The present invention thus addresses how to best send coefficients for embedded video and/or image encoding, and how to design a transform which removes more redundancy from image coefficients. These teachings may be utilized in a number of applications, such as image codecs within cameras and other image or video apparatus.

The invention is amenable to being embodied in a number of ways, including but not limited to the following descriptions.

One embodiment of the present invention is an apparatus for image encoding, comprising: (a) a computer configured for receiving image data; (b) memory coupled to the computer; and (c) programming executable on the computer for performing steps comprising: (c)(i) executing transforms on received image data into the frequency domain to generate transform coefficients within a tree having a plurality of subbands; (c)(ii) scanning of subband pairs within a desired order; (c)(iii) determining if a ring of zero-trees condition exists in which a zero-tree is detected at the same spatial location in at least two subbands; and (c)(iv) generating a ring-tree symbol within an encoded image output in response to determining that a ring of zero-trees exists. In at least one implementation, the coding is performing first on the directional subbands containing the highest energy. In at least one implementation, the plurality of subbands has the lowest frequency coefficients at a subband at a root node and spatially related coefficients at higher frequency subbands of the tree.

At least one implementation further comprises programming for selecting a scanning pattern between horizontal and vertical scanning in response to which yields the most compact encoding. At least one implementation further comprises programming for detecting a zero-tree condition and generating an associated symbol, in response to detecting that a coefficient and all its descendants are insignificant when no ring of zero-trees is detected. At least one implementation further comprises programming for detecting an isolated zero condition and generating an associated symbol, when no ring of zero-trees, or zero-tree is determined, and yet a coefficient itself is found to be insignificant. In at least one implementation, the spatial locations comprise (HL1, HL2), or (LH1, LH2), or (HH1, HH2).

In at least one implementation, the transforms are selected from the set of image data encoding techniques consisting of wavelet transforms, embedded zero-tree wavelet (EZW), and Diamond transforms as referred to herein.

One embodiment of the present invention comprises: (a) a computer configured for receiving image data as received image data; (b) memory coupled to the computer; and (c) programming executable on the computer for performing steps comprising: (c)(i) executing a transform on the received image data; (c)(ii) partitioning the energy of an image input into directional subbands of horizontal and vertical component energy in response to the diamond shaped frequency response of the input; and (c)(iii) applying a Quincunx filter bank having a combination of fan filters and shifter filters for each directional subband.

In at least one implementation, the transform comprises a frequency transform which is executed on the received image data. In at least one implementation, the fan filters and shifter filters are utilized in combination with Q-fold downsamplers. In at least one implementation, the subbands preferably comprise at least four combinations of horizontal and vertical energy including at least Low-Low (LL), Low-High (LH), High-Low (HL) and High-High (HH). In at least one implementation, the Low-Low (LL) subband iteratively passes through the Quincunx filter bank. In at least one implementation, the shifter filter is generated in response to modulation of the fan filter function. In at least one implementation, the Quincunx filter bank divides each the subband into at least a first and second output.

One embodiment of the present invention comprises an apparatus for image encoding, comprising: (a) a computer configured for receiving image data as received image data; (b) memory coupled to the computer; and (c) programming executable on the computer for performing steps comprising: (c)(i) executing a transform on the received image data; (c)(ii) partitioning the energy of an image input into directional at least four subbands of horizontal and vertical component energy in response to the diamond shape frequency response of the input; and (c)(iii) applying a Quincunx filter bank having a combination of fan filters and shifter filters, utilized in combination with Q-fold downsamplers, dividing each directional subband into at least a first and second output.

In at least one implementation, the transform comprises executing a wavelet transform on the received image data. In at least one implementation, the subbands comprise at least four combinations of horizontal and vertical energy, such as including Low-Low (LL), Low-High (LH), High-Low (HL) and High-High (HH). In at least one implementation, the Low-Low (LL) subband iteratively passes through the Quincunx filter bank. In at least one implementation, the received image data is associated with a still image or video frames.

One embodiment of the present invention is a method of image encoding within programming executing on a computer processor within an image encoder, comprising: (a) executing transforms on received image data into the frequency domain to generate transform coefficients within a tree having a plurality of subbands; (b) scanning of subband pairs in a desired order; (c) determining if ring of zero-trees exists in response to detecting the existence of a zero-tree at the same spatial location in at least two subbands; and (d) generating a ring-tree symbol within the encoded image in response to determining that a ring of zero-trees exists.

One embodiment of the invention is a method of image encoding within programming executing on a computer processor within an image encoder, comprising: (a) executing a transform on the received image data; (b) partitioning the energy of an image input into directional subbands of horizontal and vertical component energy in response to the diamond shape frequency response of the input; (c) applying a Quincunx filter bank to each directional subband; whereby the Quincunx filter bank has fan filters in combination with Q-fold downsamplers, and shifter filters in combination with Q-fold downsamplers, for processing each the subband. The method provides similar encoding efficiencies of traditional approaches in response to the encoding of images which do not have significant directional energies. The invention provides an improvement of 2D separable wavelet transforms for representing images with smooth contours.

The present invention provides a number of beneficial aspects which can be implemented either separately or in any desired combination without departing from the present teachings.

An aspect of the invention is an apparatus and method for performing embedded image encoding.

Another aspect of the invention is an image encoding apparatus and method which encodes ring-trees to decrease bit rate in response to an increased level of clustering.

Another aspect of the invention is an image encoding apparatus and method in which ring-trees are represented in the coded output using an additional symbol.

Another aspect of the invention is an image encoding apparatus and method utilizing a new directional transform referred to as the Diamond transform.

Another aspect of the invention is an image encoding apparatus and method utilizing Quincunx filters associated with the directional transform.

A still further aspect of the invention is an apparatus and method for image coding which can be utilized with a variety of image apparatus, including image codecs.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 18A through 18C are images of energy distribution resulting from the use of the Quincunx filter bank of FIG. 15 for the HH subband.

FIG. 19 is a block diagram of image encoding according to aspects of the present invention.

DETAILED DESCRIPTION OF THE INVENTION

Figure 1:
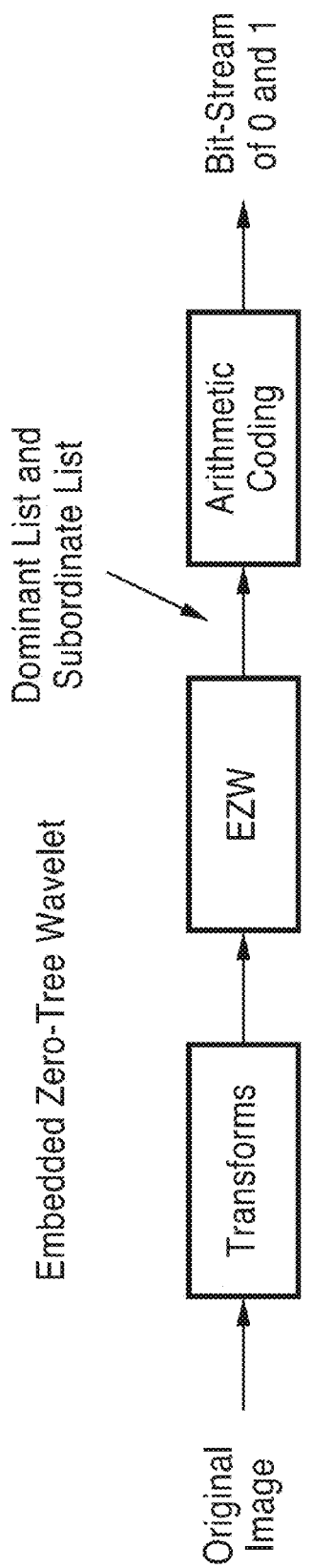
FIG. 1 is a block diagram of image encoding using typical embedded zero-tree wavelet (EZW).

Referring more specifically to the drawings, for illustrative purposes the present invention is embodied in the apparatus generally shown in FIG. 2 through FIG. 22. It will be appreciated that the apparatus may vary as to configuration and as to details of the parts, and that the method may vary as to the specific steps and sequence, without departing from the basic concepts as disclosed herein.

1. Introduction.

Referring back to FIG. 1, it should be appreciated that EZW (Embedded Zero-trees of Wavelet Transforms) is a lossy image compression technique. When operating at high compression ratios the majority of coefficients produced by a subband transform (e.g., wavelet transform) are zero, or substantially close to zero as the majority of images comprise low frequency information. When coding high frequency portions, such as edges in the image, these coefficients must be represented to provide a high-quality image representation.

By considering the transformed coefficients as a tree (or trees) with the lowest frequency coefficients at the root node and with the children of each tree node being the spatially related coefficients in the next higher frequency subband, there is a high probability that one or more subtrees will consist entirely of coefficients which are zero or nearly zero, such subtrees are called zero-trees. Due to this, the terms node and coefficient are used interchangeably, and reference to the children of a coefficient mean the child coefficients of the node in the tree where that coefficient is located. The term children is used in referring to directly connected nodes which are lower in the tree and descendants which refer to all nodes that are below a particular node in the tree, even if not directly connected.

In any zero-tree based image compression method statistical properties of the trees are utilized in order to efficiently code the locations of the significant coefficients. As the majority of coefficients will be zero or close to zero, the spatial locations of the significant coefficients make up a large portion of the total size of a typical compressed image. A coefficient or a tree is considered significant if its magnitude (or the magnitudes of a node and its descendants within a tree) matches or exceeds a particular threshold. By changing the thresholds, such as starting with a threshold close to the maximum coefficient magnitudes and iteratively decreasing the threshold, compressed representations of an image can be created which progressively add finer detail with each threshold decrease. In response to tree structure, it is most probable that if a coefficient in a particular frequency band is insignificant, then all its descendants comprising spatially related higher frequency band coefficients will also be insignificant.

2. Ring-Tree Coding.

Before proceeding to discuss ring-tree coding, it is beneficial to understand aspects of contourlet transforms which provide several scales in similar manner to wavelet transforms. At each scale several directions exist, specifically $2^n$. These directions can be generally classified as either more horizontal ($2^{n-1}$ directions) and referred to as a horizontal set, or more vertical (the other $2^{n-1}$ directions) and referred to as a vertical set. This is why contourlet transforms are said to have directional localization, in addition to the time and frequency localization of wavelets.

Each contourlet coefficient is the result of a filtering process between the original image and the equivalent 2D contourlet filter at a particular special location. At this same spatial location, the contourlet transform applies to the other $2^{n-1}-1$ directions, in the same horizontal or vertical set, which are the collocation contourlet transform coefficients.

To determine if a ring of zero-trees exists at a particular spatial location, scale, and direction set (horizontal or vertical), it is necessary to verify if all the contourlet coefficients at this location, scale, and directions are zero.

Figure 2:
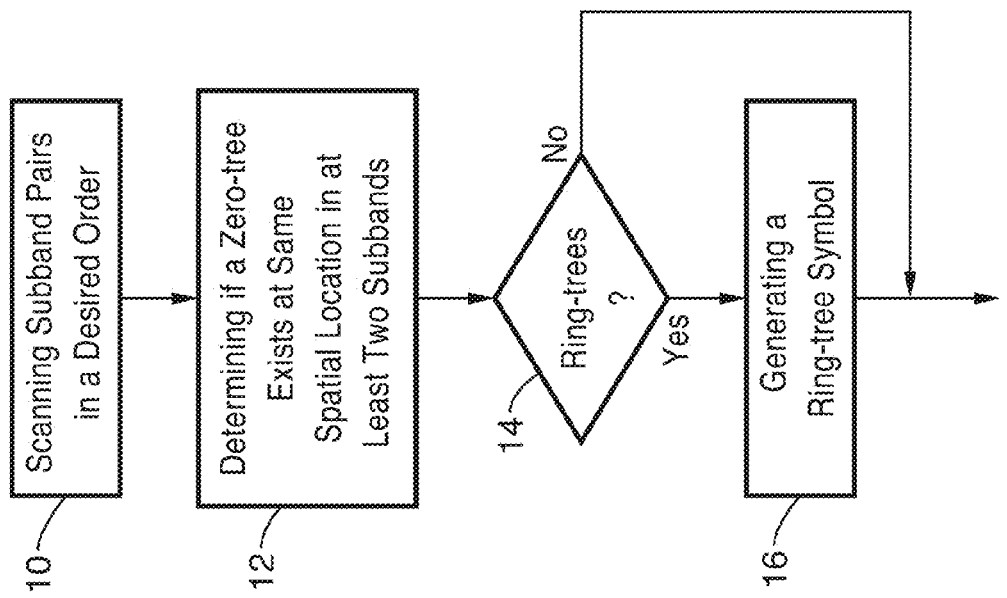
FIG. 2 is flowchart of ring-tree coding according to an embodiment of the present invention.
Figure 15:
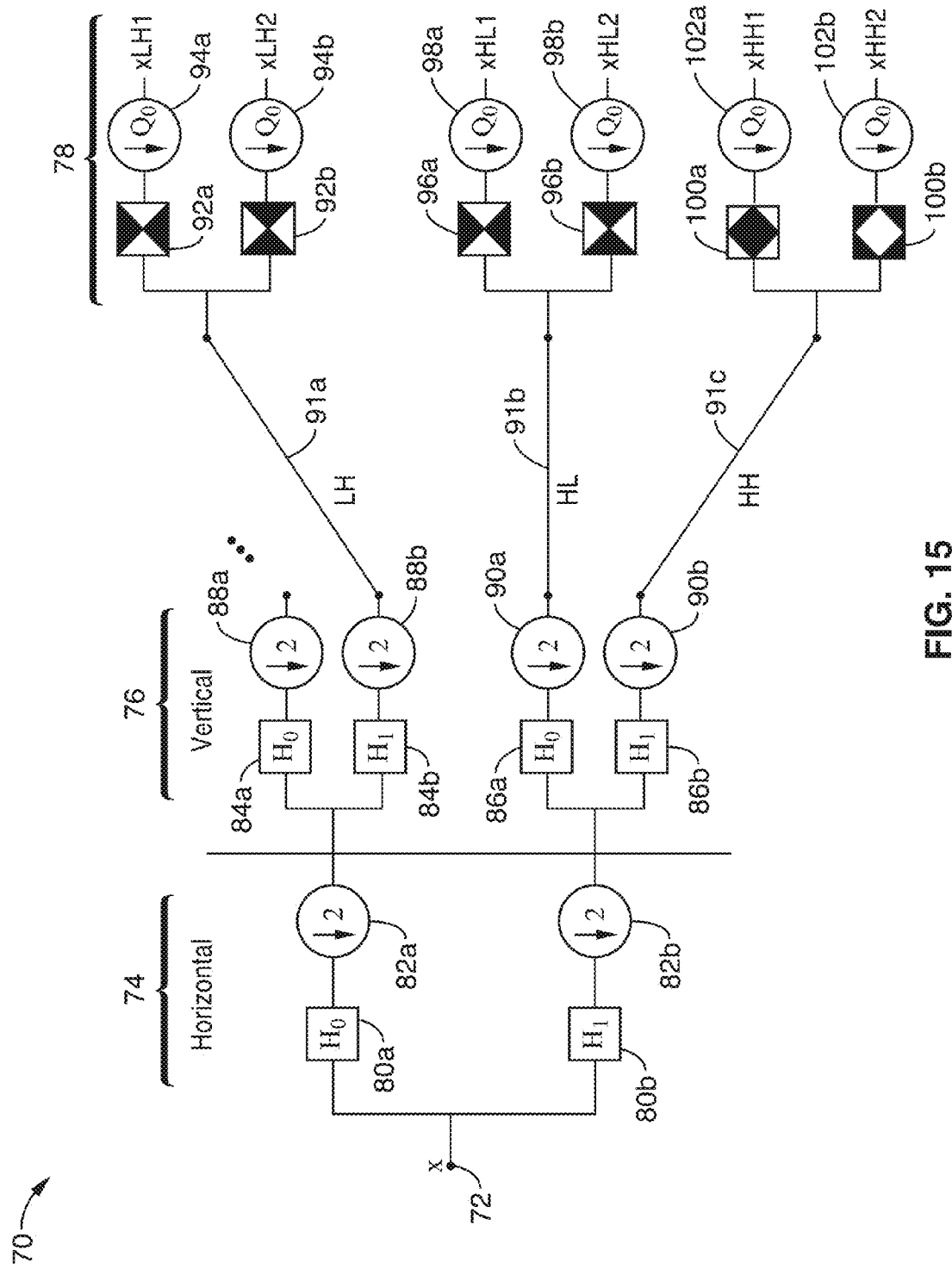
FIG. 15 is a schematic of a Quincunx filter bank, having horizontal and vertical taps, used according to an element of the present invention.

FIG. 2 illustrates an example embodiment 10 of ring-tree coding which generates a symbol for representing any detected ring-trees. The name "ring-tree" is derived from the determination that a ring of zero trees exists in which several trees of coefficients are all zero. The zero-tree can be defined similarly to the traditional approach, in which if a coefficient and all its descendants are insignificant, a zero-tree is considered to exist at this coefficient. The encoding process can then follow any desired encoding path, such as depicted in FIG. 1. By extension of the above, the ring of zero-trees is considered to arise when at least two zero-trees exist at the same spatial location in subband pairs, such as (HL1, HL2), or (LH1, LH2), or (HH1, HH2), as seen in FIG. 15, which is discussed in a later section.

FIG. 2 depicts an embodiment of determining a ring of zero-trees. Scanning of subband pairs is performed in a desired order 10. The scanning verifies if a ring of zero-trees exists. The ordering, such as LH1 before LH2, HL2 before HL1, and HH1 before HH2; among the pair of subbands is important because there is usually more energy in the first subband than in the second, wherein the scanning speed is increased. A determination 12 is then made if a zero-tree exists at same spatial location in at least two subbands. Then in response to detecting 14 a ring of zero-trees, a ring-tree symbol is generated 16.

It will be appreciated that this scanning order aids in the case of embedded coding. Once a coefficient is sent, it will be marked as zero in the subsequent bit-plane. Therefore, using this particular ordering helps to produce more rings of zero trees in the subsequent bit-plane.

Figure 3:
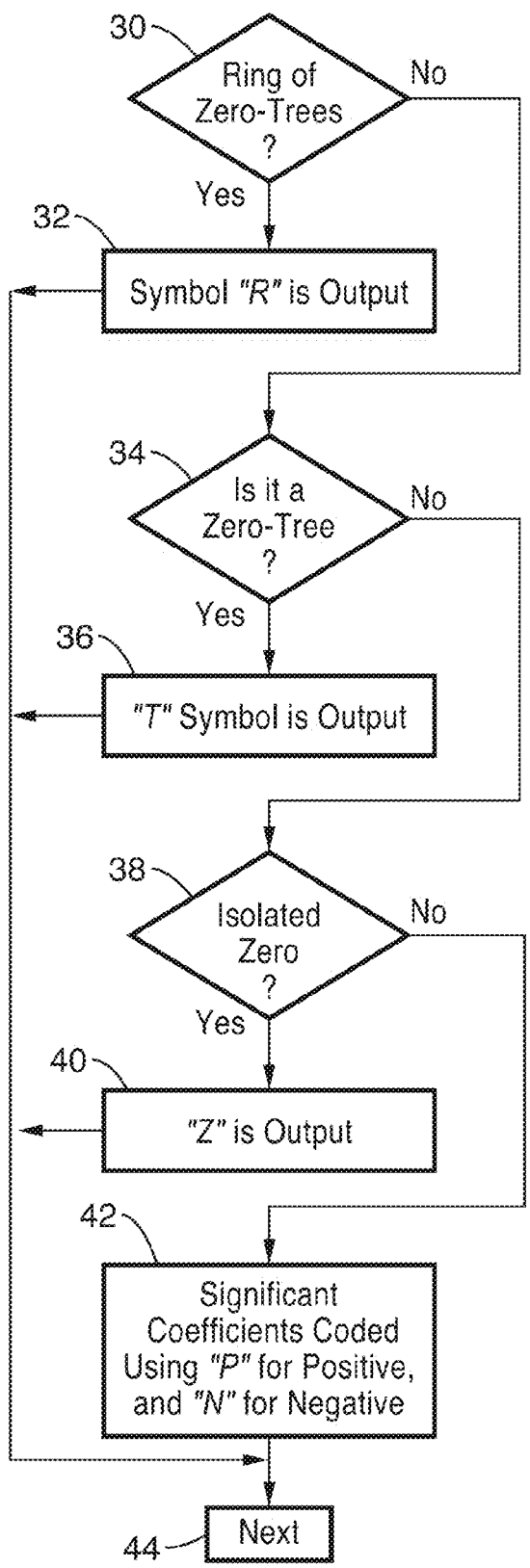
FIG. 3 is flowchart of hybrid ring-tree and zero-trees coding according to an embodiment of the present invention.

FIG. 3 illustrates an example embodiment of hybrid ring-tree zero-tree coding which generates symbols for both ring-trees and zero-trees. The hybrid approach uses both the zero-trees and ring-trees symbols for coding insignificant coefficients. A check 30 is first made for a ring of zero-trees as described in FIG. 2, and if detected a symbol "R" is output 32. Otherwise, if it is not a ring of zero-trees, then a check 34 is made to determine if it is a zero-tree. If it is a zero-tree then a "T" symbol is output 36, and if not a zero-tree then it is an isolated zero 38, whereby a "Z" is output 40. If not an isolated zero, then it must be a significant coefficients, which is coded 42 using a "P" symbol for positive coefficients, and "W" for negative coefficients. Then the process continues 44 with subsequent coefficients.

Figure 4:
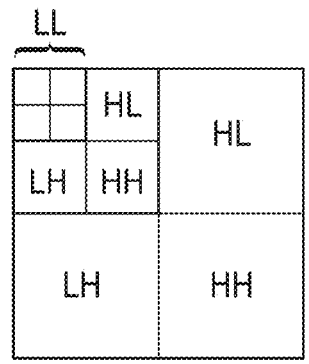
FIG. 4 is a partitioning diagram showing a hierarchy of frequency subbands with each hierarchy divided into a most significant block and three other blocks according to the present invention.
Figure 5:
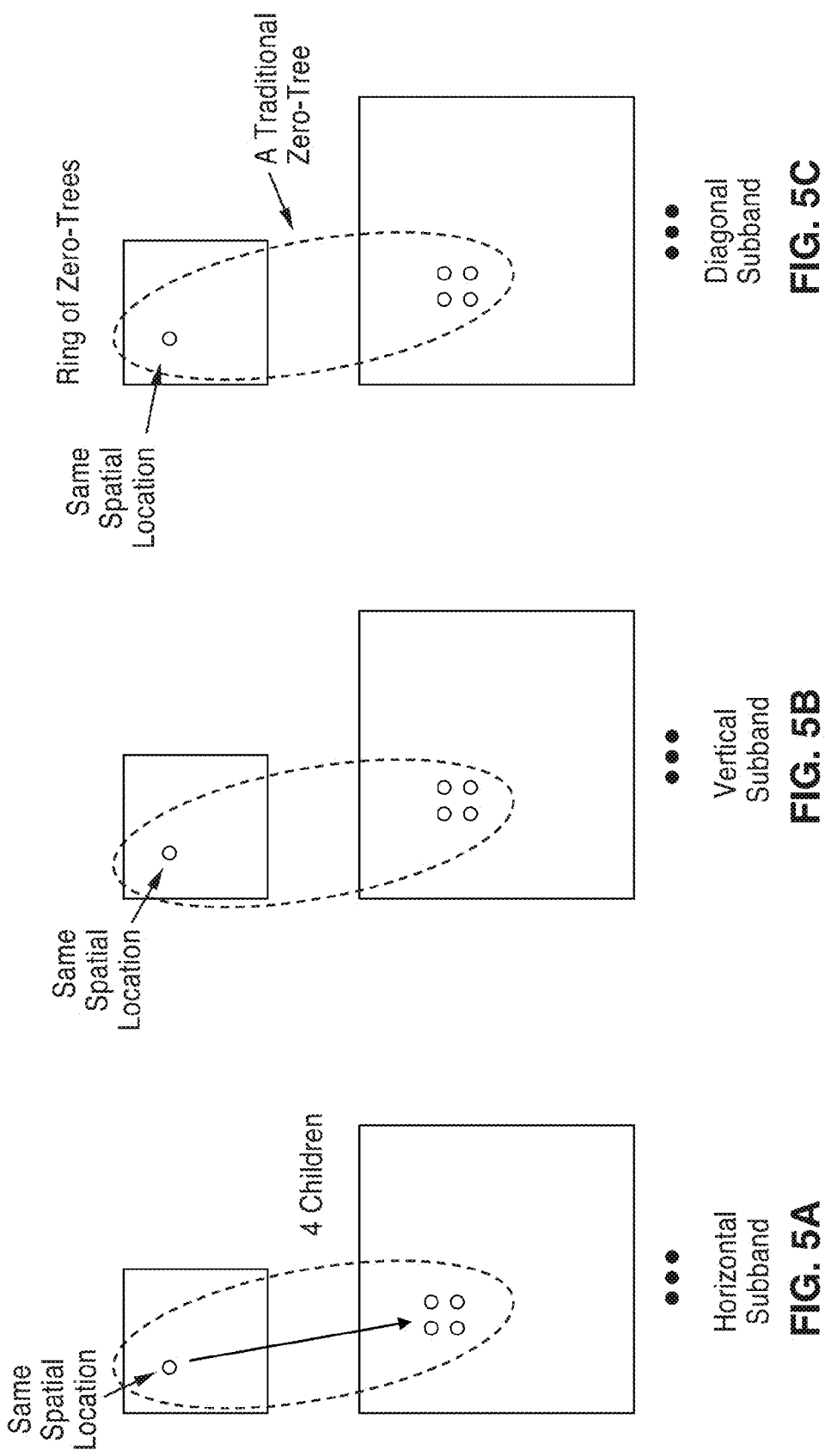
FIG. 5A through 5C are partitioning diagrams showing horizontal and vertical subbands according to the present invention and diagonal subband according to a traditional zero-trees approach.
Figure 6:
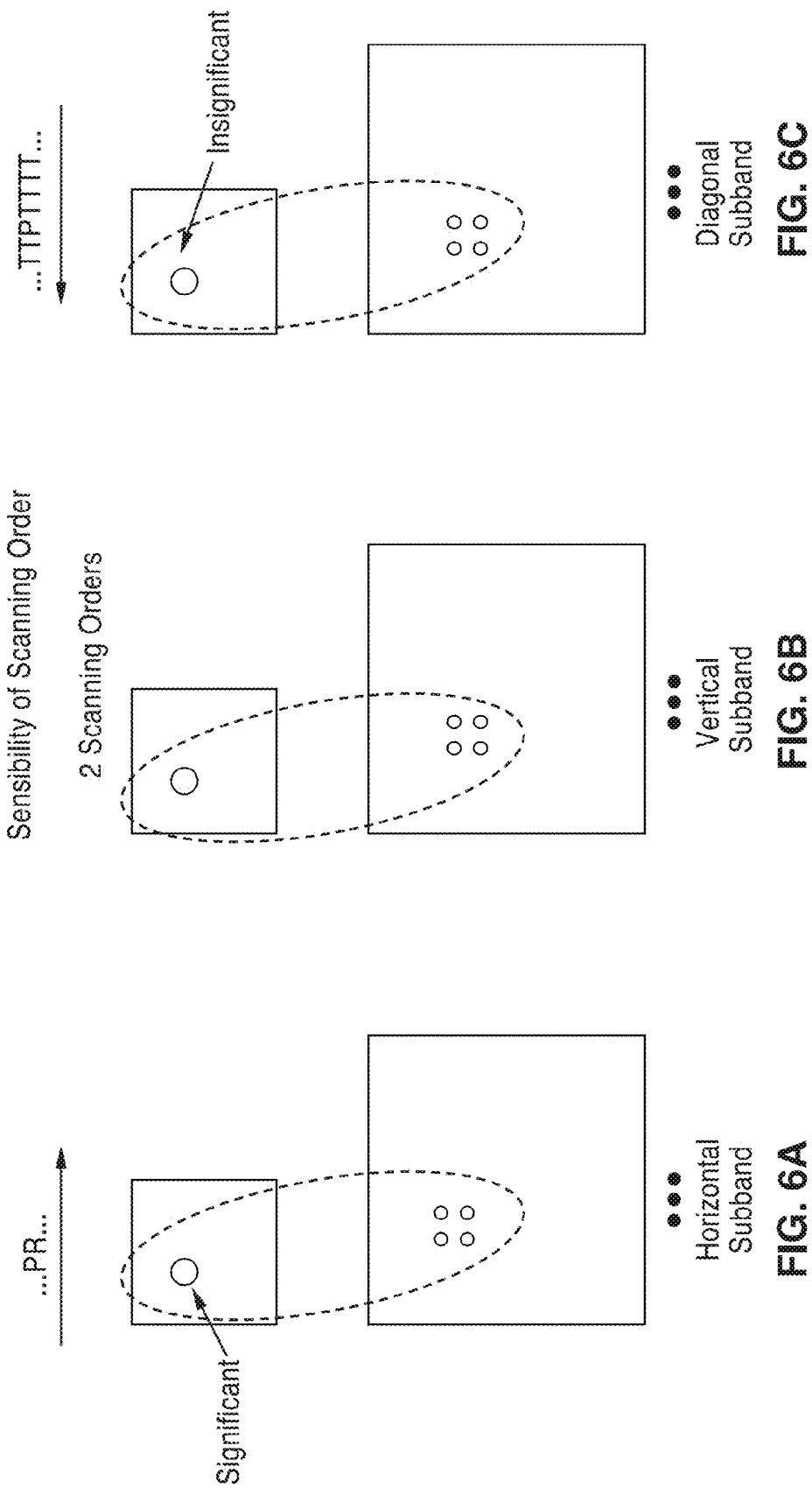
FIG. 6A through 6C are partitioning diagrams of horizontal and vertical subbands according to the present invention and diagonal subband according to a traditional zero-trees approach, showing scanning order configurations.

FIG. 4 depicts coefficient block partitioning into a hierarchy of frequency subbands, such as according to a wavelet transform. The image block is divided into a most significant block, which is subdivided into smaller blocks, and three other blocks. The four blocks in each division are referred to as LL, HL, LH and HH. By way of example, the most significant block LL is shown with two subdivisions in the figure.

It should be appreciated that the new diamond directional transform according to the present invention, does not have to use the ring of zero-trees, but can alternatively utilize traditional zero-tree approaches. However, by way of example and not limitation, the following describes its use in combination with the ring of zero-trees.

FIG. 5A through FIG. 5C illustrate an embodiment of a ring of zero-trees FIG. 5A and FIG. 5B as compared with the use of a traditional zero-trees approach in FIG. 5C. A form of octave band partitioning is shown partitioning the coefficients into a small square and a large L-shape. The dotted lines signify that other scales exist further down the tree.

FIG. 6A through FIG. 6C illustrate an operation of a hybrid approach which adds a ring-tree symbol to the set of symbols used with EZW as outlined above toward coding a higher level of insignificant coefficients.

It will be appreciated that as the performance of the present invention is sensitive to the scanning pattern, that this pattern can be optimized in various ways. In FIG. 6A the scanning of significant coefficients in the horizontal subband outputs " . . . PR . . . " with the symbol for a positive coefficient "P" followed by symbol indicative of a ring of zero-trees "R". Scanning of significant coefficients in the vertical subband is shown in FIG. 6B. By way of comparison, a typical zero-trees approach is shown in FIG. 6C in which scanning of what appears an insignificant coefficient yields symbol outputs " . . . TTTTPTT . . . ". Accordingly, aspects of the present invention preferably determine an optimum scanning pattern, including whether to perform horizontal or vertical scanning first, in response to determining which yields the most compact encoding.

FIG. 7 through FIG. 10 depict test results comparing EZW zero-tree, ring-tree, and hybrid ring-tree encoding according to aspects of the present invention using both wavelet and contourlet transforms for two different images.

Figure 7:
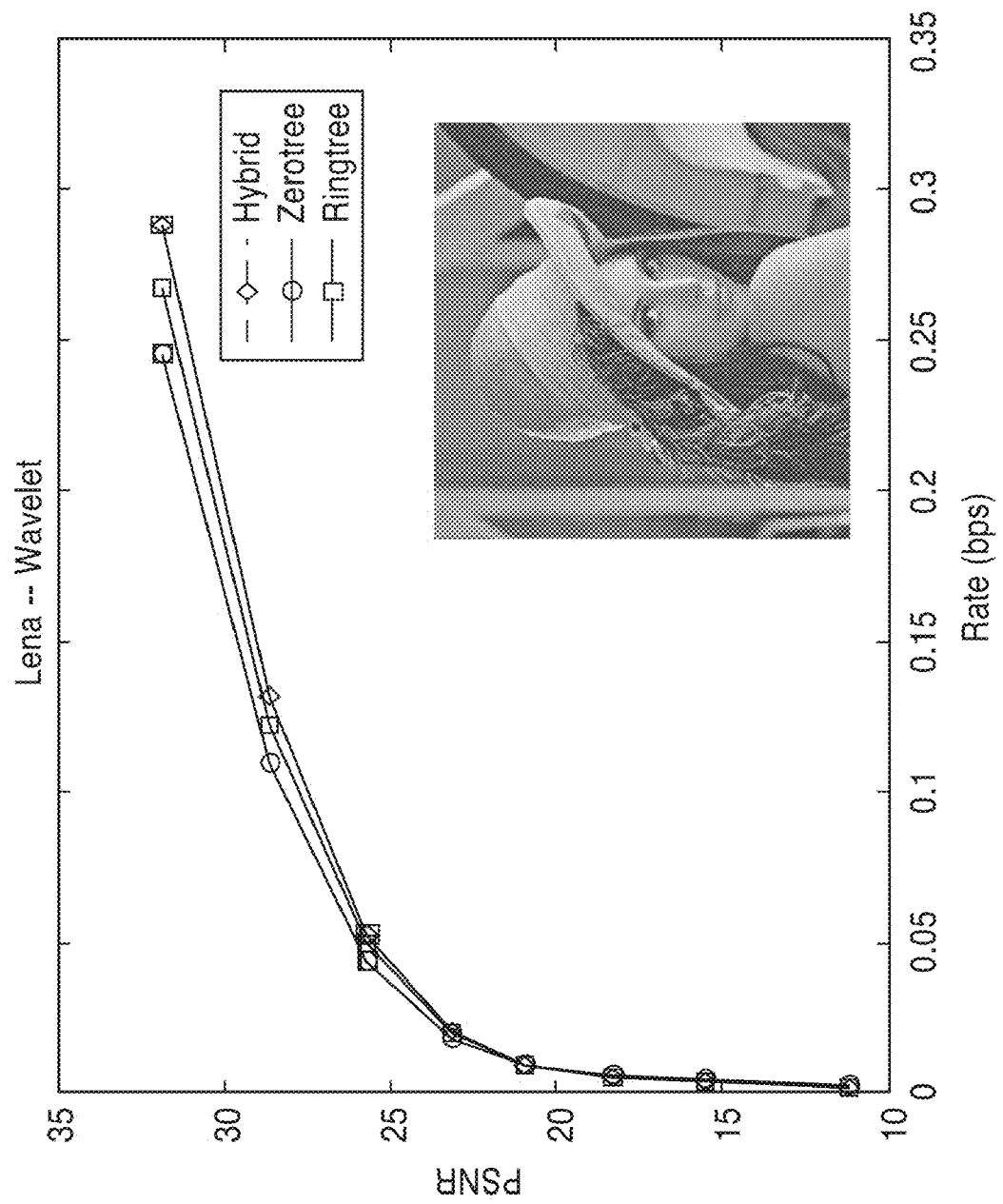
FIG. 7 is a graph comparing the ring-tree zero clustering using wavelet transforms on the image "Lena" according to the present invention with other zero tree coefficient clustering mechanisms.
Figure 8:
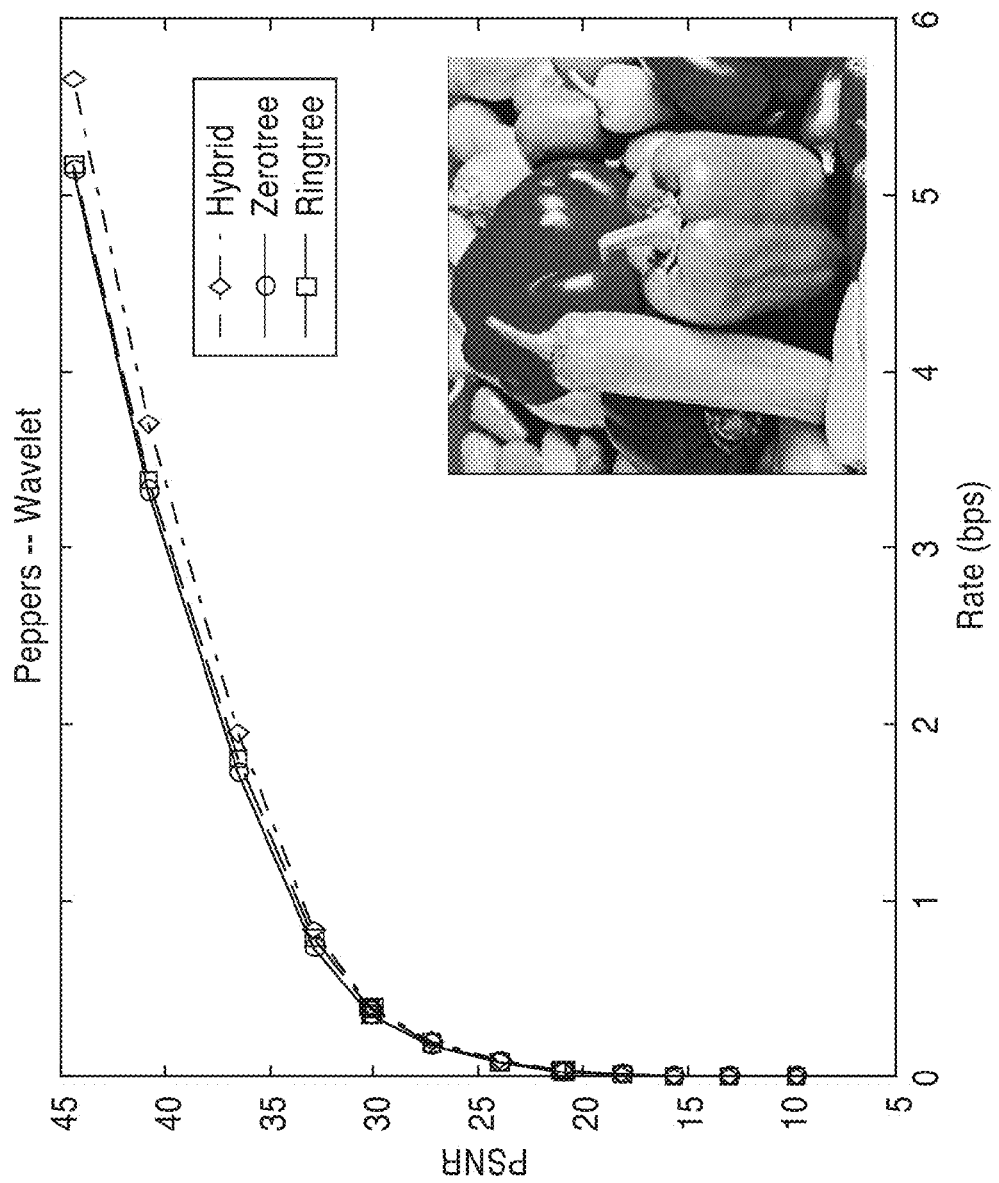
FIG. 8 is a graph comparing the ring-tree zero clustering using wavelet transforms on the image "Peppers" according to the present invention with other zero tree coefficient clustering mechanisms.
Figure 9:
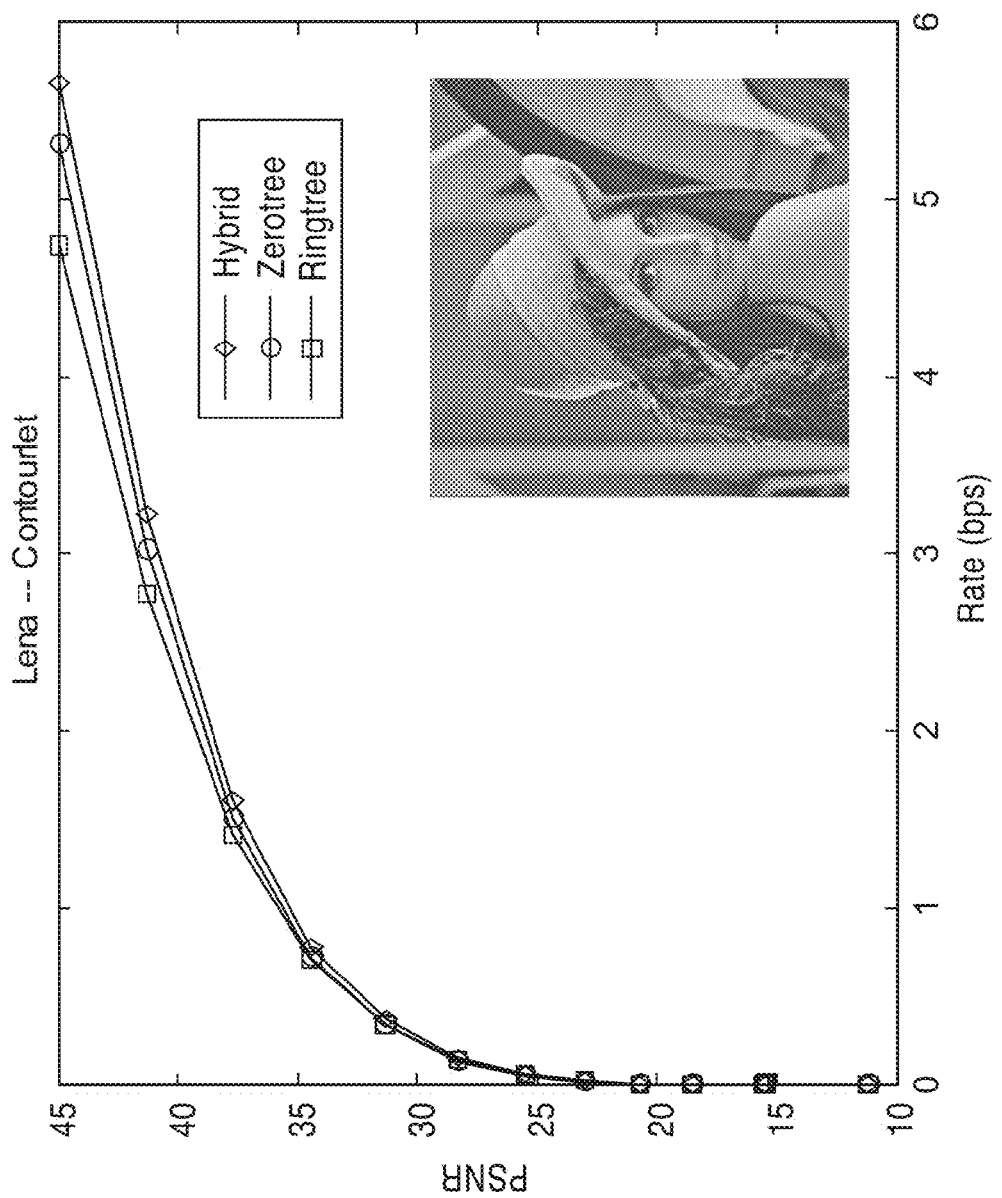
FIG. 9 is a graph comparing the ring-tree zero clustering using contourlet transforms on the image "Lena" according to the present invention with other zero tree coefficient clustering mechanisms.
Figure 10:
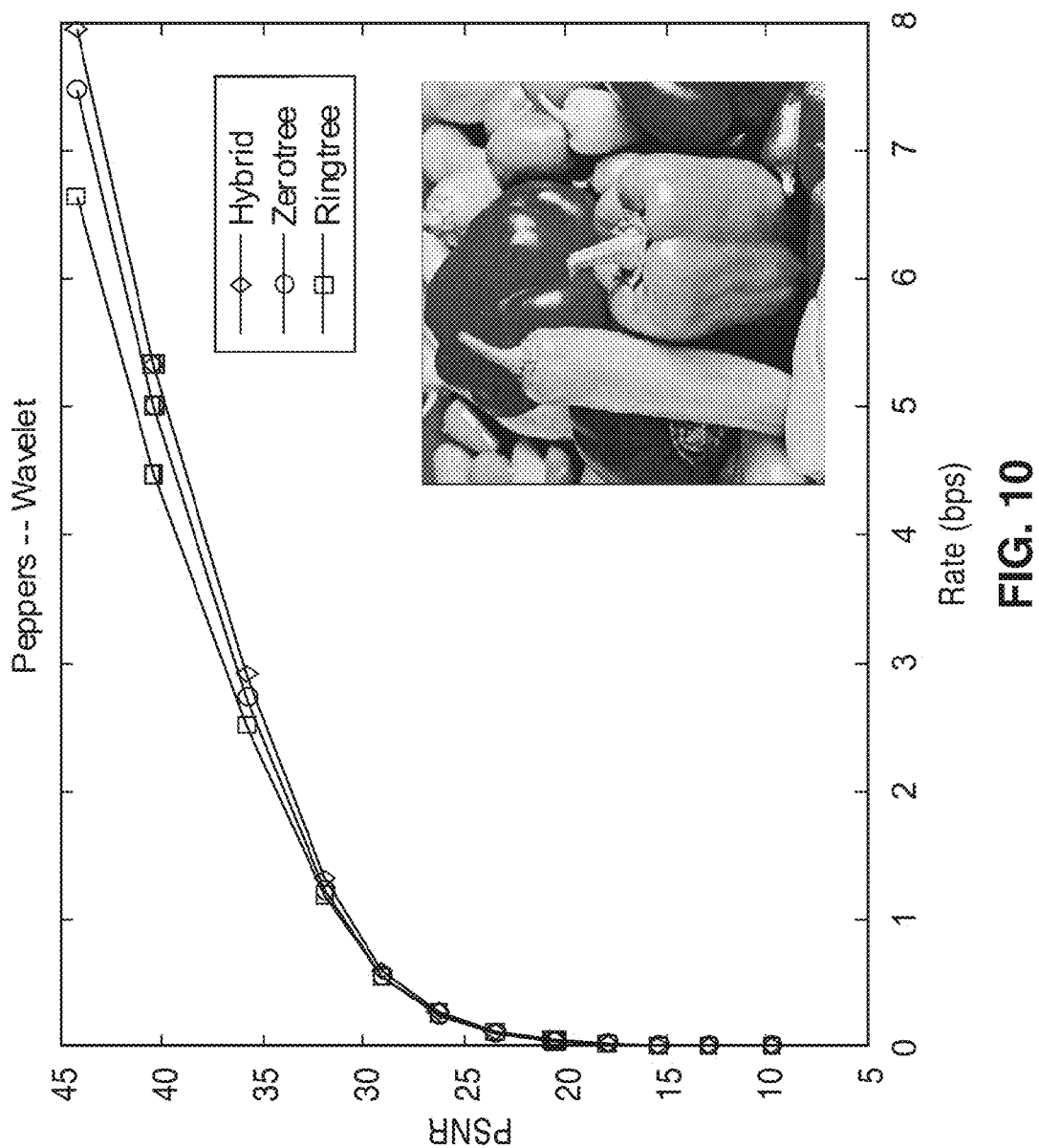
FIG. 10 is a graph comparing the ring-tree zero clustering using contourlet transforms on the image "Peppers" according to the present invention with other zero tree coefficient clustering mechanisms.

By way of example and not limitation, the results were gathered under the following conditions. The wavelet transform was tested having six decomposition levels and using a 9-7 tap wavelet filter. The contourlet transform was performed with six decomposition levels with [2 3 3 4 4 5] level of directional decompositions. An ideal arithmetic coding was utilized and entropy utilized as the measure of bit rate. In FIG. 7 wavelet transforms are depicted for the image "Lena", while in FIG. 8 a wavelet transform is depicted for the image "Peppers". In FIG. 9 contourlet transforms are depicted for the image "Lena", while in FIG. 10 a contourlet transform is depicted for the image "Peppers."

From the above tests, it was seen that the ring of zero-trees coding worked in conjunction with wavelet transforms better than with conventional EZW at low bit rates, and showed general improvement over EZW using contourlet transforms. The hybrid approach provides a more compact coding of the significant map while incurring the cost of an additional symbol.

It should be appreciated that embodiments of the present invention can be implemented toward generating improved results by rearranging the scanning order at each resolution based on previous information, such as the magnitude of the parent and directionality considerations. In addition, the directional subband containing the highest energy can be coded first, as it will be seen that in contourlet transforms the horizontal and vertical directions often have significant energies.

3. New Diamond Directional Transform.

Figure 12:
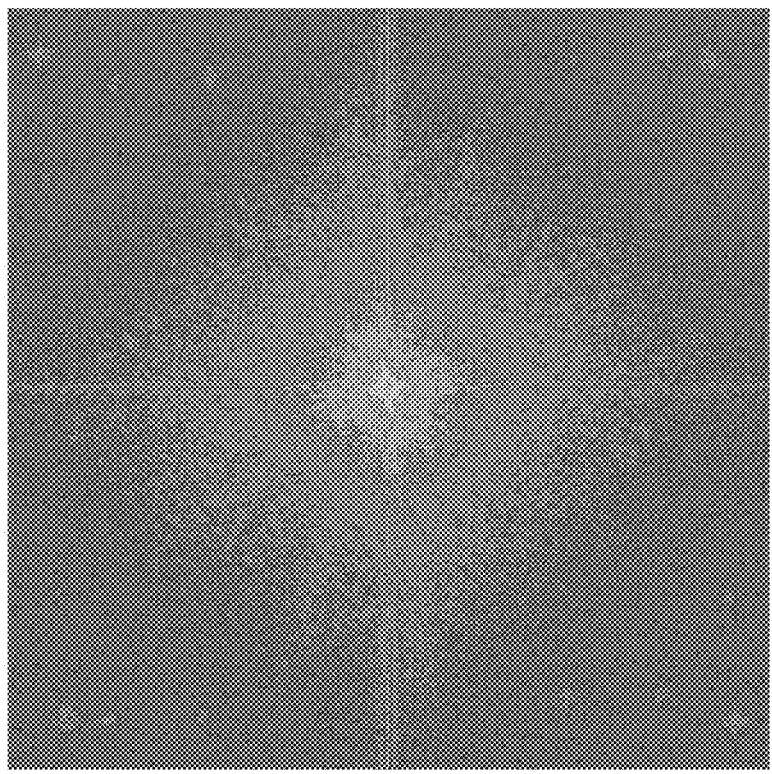
FIG. 12 is a graph (log(|X|) of the "Peppers" image.
Figure 11:
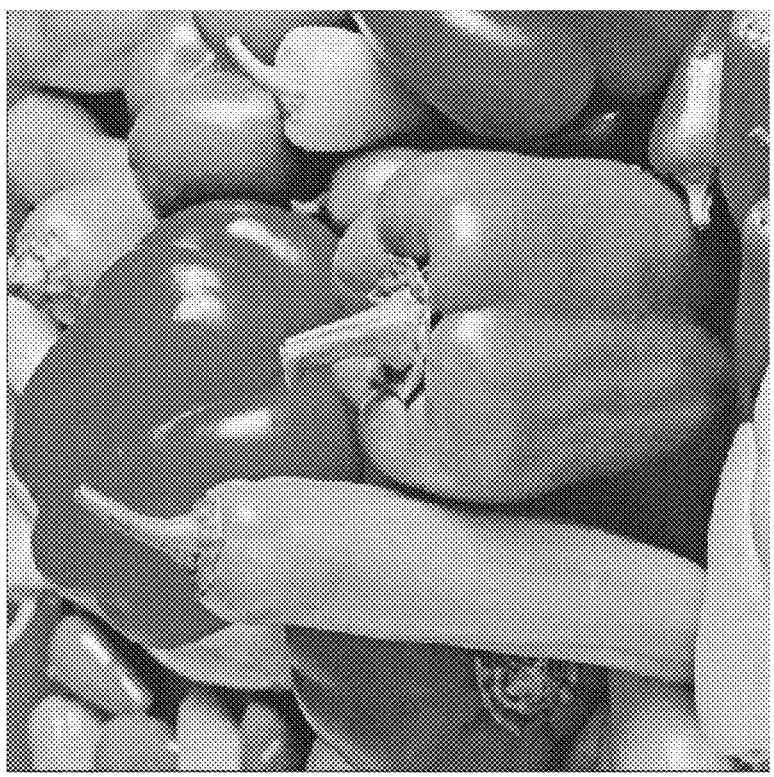
FIG. 11 is an image referred to as "Peppers" shown in the spatial domain.

FIG. 11 and FIG. 12 compare an image "Peppers", shown in the spatial domain X in FIG. 11, as compared with the same image shown in the frequency domain log(|X|) in FIG. 12. It will be seen that the image depicted, and images in general, have a diamond-shaped frequency response. Image compression is performed according to the present invention with the intent of taking advantage of this diamond-shaped frequency spectrum of images.

The present invention recognizes the opportunity found in this diamond-shaped response and teaches a new directional transform, referred to herein as a "diamond transform" which can be utilized with the zero-trees method to provide more efficient embedded image coding.

Directional transforms are taught which provide energy compact coefficients and the ability to capture directional energy (e.g., of wavelet subbands) toward rendering improved visual quality. The invention improves on the use of 2D separable wavelet transforms for representing images with smooth contours. Test results illustrate that the technique is competitive with existing methods when coding non-directional energy, while providing improved performance on images which display strong directional energy.

The new diamond transform utilizes the directional properties of wavelet subbands to obtain more compact coefficients. Image energy is separated into horizontal and vertical component energy using Quincunx filter banks on the wavelet subbands.

Figure 13:
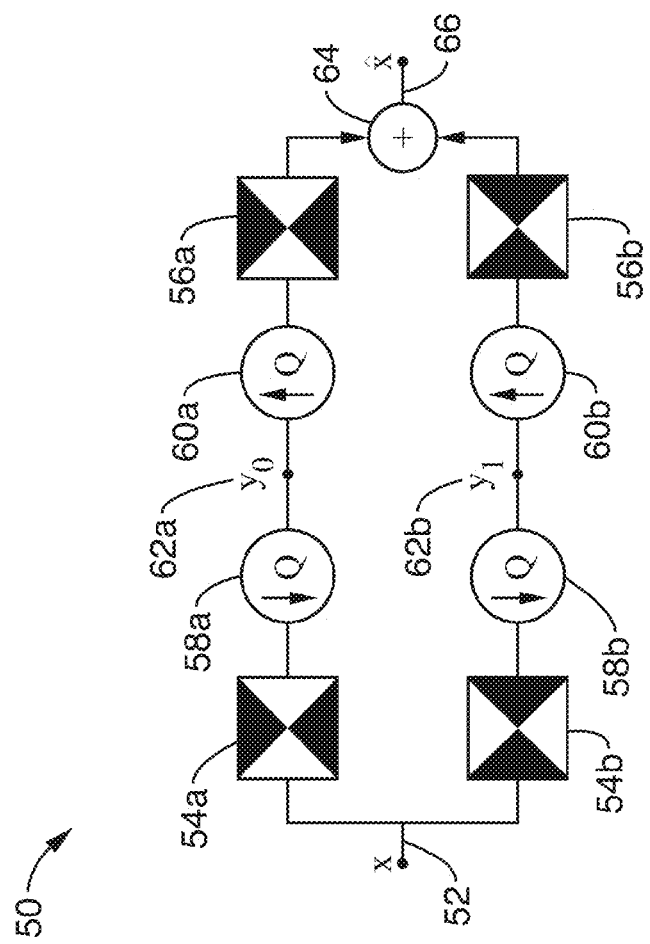
FIG. 13 is a schematic of a Quincunx filter bank, having horizontal and vertical taps, used according to an element of the present invention.

FIG. 13 illustrates a Quincunx filter bank 50 utilized within at least one embodiment according to the present invention. The Quincunx filter banks utilizing diamond filters (also referred to as "fan" filters), are applied to input 52 on wavelet subbands. Shown in the figures are analysis filters 54a, 54b and synthesis filters 56a, 56b. Q-fold downsamplers 58a, 58b are also shown in the figure along with Q-fold upsamplers 60a, 60b. Horizontal energy output 62a and vertical energy output 62a are shown between the down and up-samplers. Outputs from the diamond filters are summed 64 with output x̂ 66.

Figure 14:
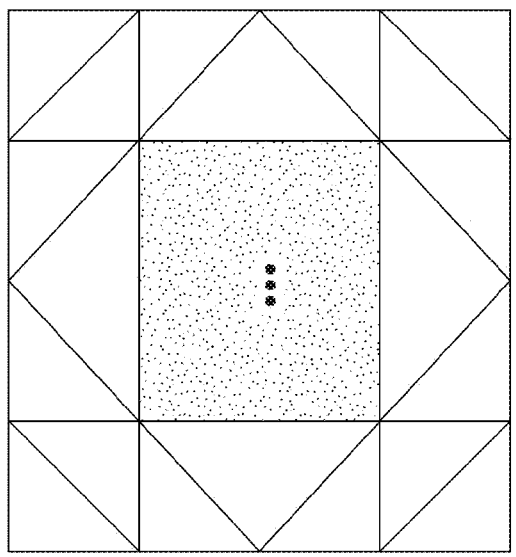
FIG. 14 is a frequency partition shown representing an element of the present invention.

FIG. 14 illustrates a frequency partition of the new diamond transform.

FIG. 15 illustrates a Quincunx filter bank utilized in the new diamond transform 70 using fan filters (diamond filters) and shifter filters which provide frequency partitioning in the horizontal and vertical directions with subdivided outputs in each of the regions LH, HL and HH. It should be appreciated that the Low-Low (LL) subband iteratively goes through the same six channel filter banks LH1, LH2, HL1, HL2, HH1, HH2. Input 72 is filtered horizontally 74 and vertically 76 into a plurality of directional subbands 91a-91c and through a Quincunx filter bank 78. Horizontal filtering is depicted with horizontal filters 80a, 80b and downsampling 82a, 82b. Vertical filtering is depicted with filters 84a, 84b, 86a, 86b, and downsampling 88a, 88b, 90a, and 90b. Three of the subbands LH 91a, HL 91b and HH 91c are shown entering into a Quincunx filter bank 78 which for the inventive transform comprises fan filters 92a, 92b, 96a, 96b, shifter filters 100a, 100b, and Q-fold downsamplers 94a, 94b, 98a, 98b, 102a, and 102b.

It should be appreciated that the shifter filter can be obtained from a simple modulation of the fan filter, and vice-versa. The coefficients in one of these subbands have four children at the lower scale, as well as one directional sibling. For example, a coefficient in HL1 has its sibling in HL2 at the same spatial location, and so on.

FIG. 16A through FIG. 18C depict energy from the wavelet subbands and its finer decompositions as shown in FIG. 15. These figures show that the energy is concentrated more on subbands LH1, HL2, HH1 than on the corresponding subbands LH2, HL1, HH2. The standard deviation is computed in relation to its mean.

Figures 16A, 16B, 16C:
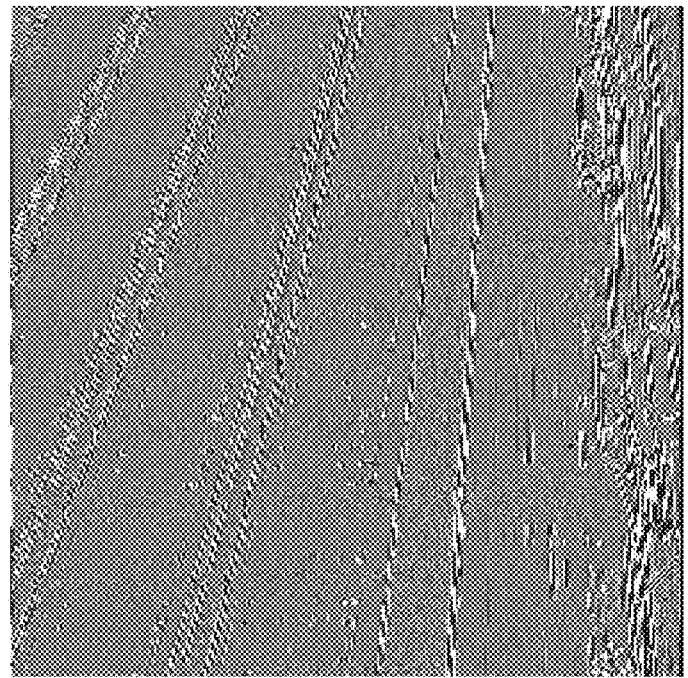
FIG. 16A through 16C are images of energy distribution resulting from the use of the Quincunx filter bank of FIG. 15 for the LH subband.

In FIG. 16A energies are depicted from the LH subband (xLH), with FIG. 16B showing LH2 (xLH2) and indicating the removal of horizontal energy, and FIG. 16C showing LH1 (xLH1). In this test the standard deviation for xLH1 was found at 18.31, while that of xLH2 was 7.68.

Figure 17B:
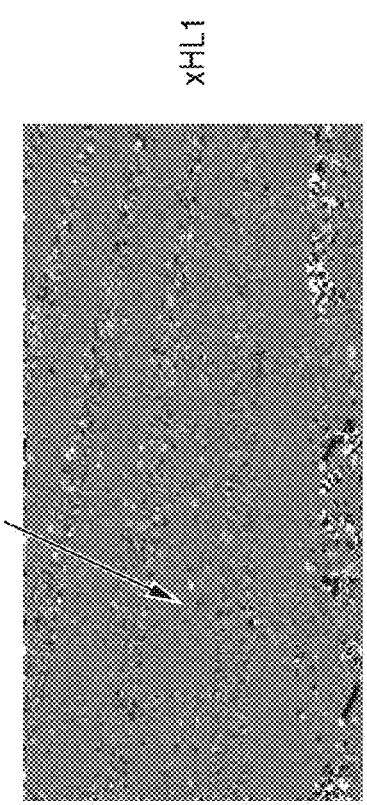
FIG. 17A through 17C are images of energy distribution resulting from the use of the Quincunx filter bank of FIG. 15 for the HL subband.
Figure 17C:
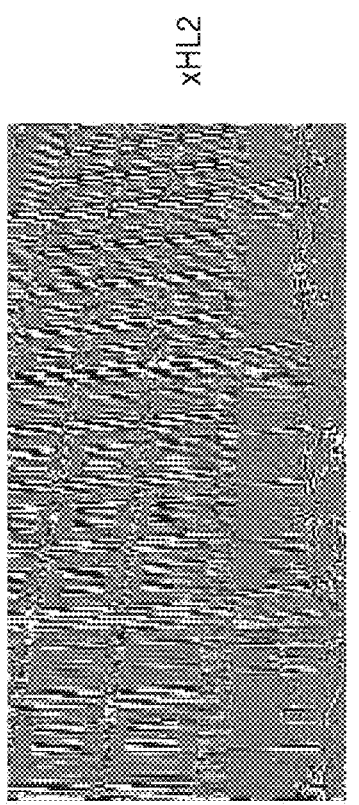
Figure 17A:
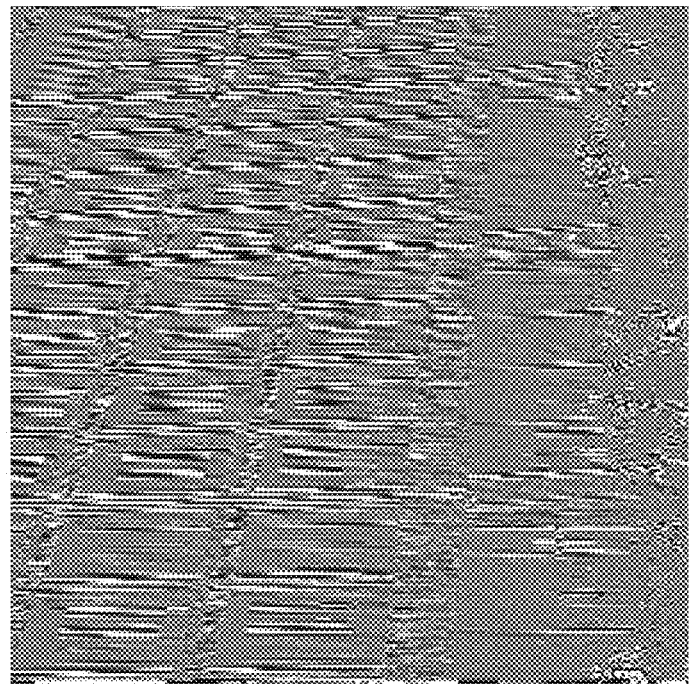

In FIG. 17A energies are depicted from the HL subband (xHL), with FIG. 17B showing HL1 (xHL1) and indicating the removal of vertical energy, and FIG. 17C showing HL2 (xHL2). In this test the standard deviation for xHL1 was found at 6.32, while that of xHL2 was 27.93.

In FIG. 18A energies are depicted from the HH subband (xHH), with FIG. 18B showing HH2 (xHH2), and FIG. 16C showing HH1 (xHH1). In this test the standard deviation for xHH1 was found to be 6.01, while that of xHH2 was 2.92.

FIG. 19 illustrates an example embodiment 130 of an encoder shown comprising a computer processor (CPU) 132 and memory 134. It should be appreciated that these processing components may be implemented singularly, or as multiprocessors, and/or with any desired level of acceleration hardware, without departing from the teachings of the present invention. Computer 132 is configured for performing signal processing in receiving signal 136 and applying a transform to it, such as wavelet, EZW, SPIHT, contourlet or a new diamond transform according to the present invention. Compression is performed in block 140 and then an optional loss less entropy encoding may be performed as depicted in block 142 toward producing a coded output 144.

It will be appreciated that a similar process to the above can be performed by programming executable on a computer processor for decoding the encoded stream to return image data.

Figure 20:
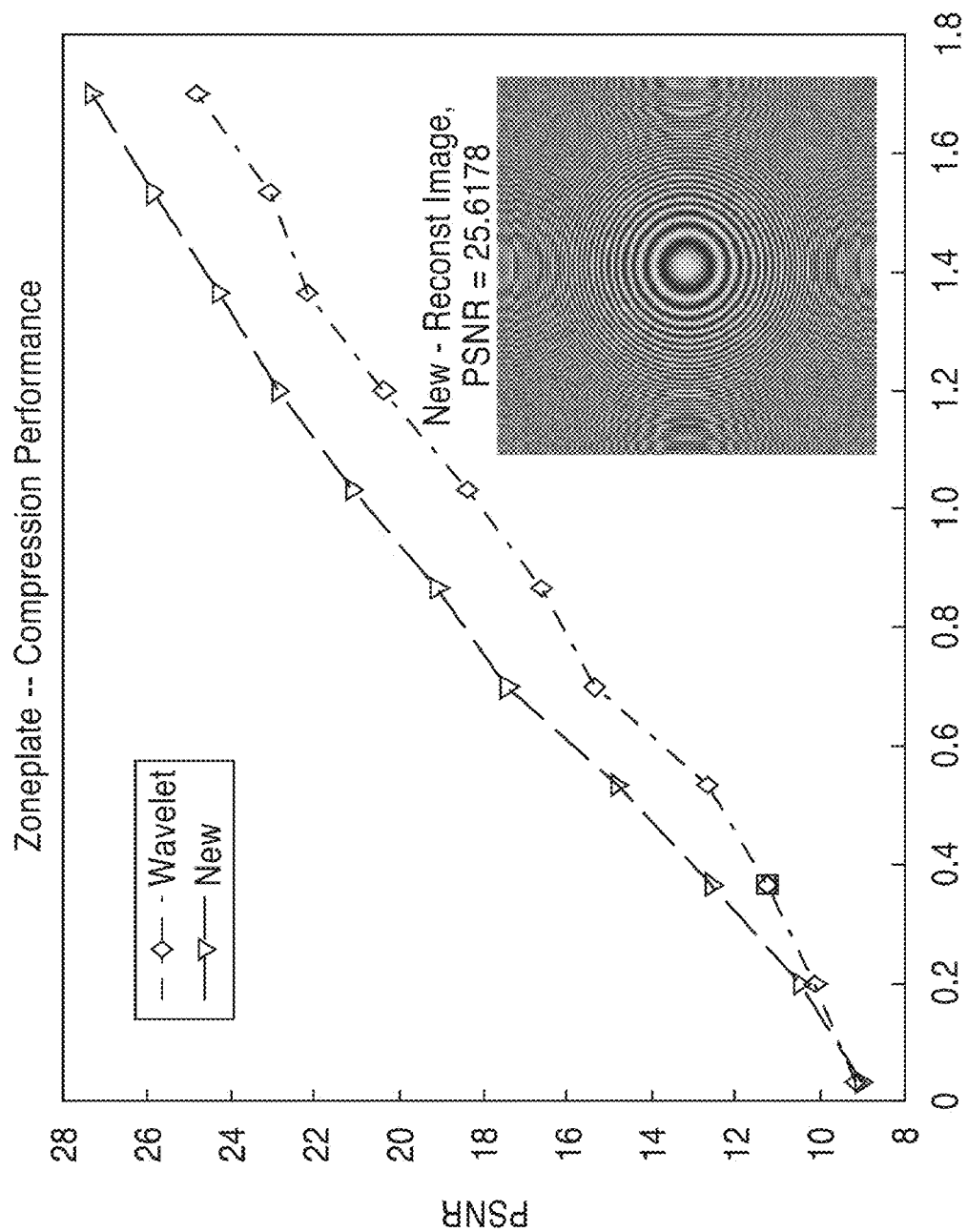
FIG. 20 is a graph of compression performance on a "Zoneplate" image (inset) for a new directional transform according to an embodiment of the present invention as compared with a wavelet transform.
Figure 21:
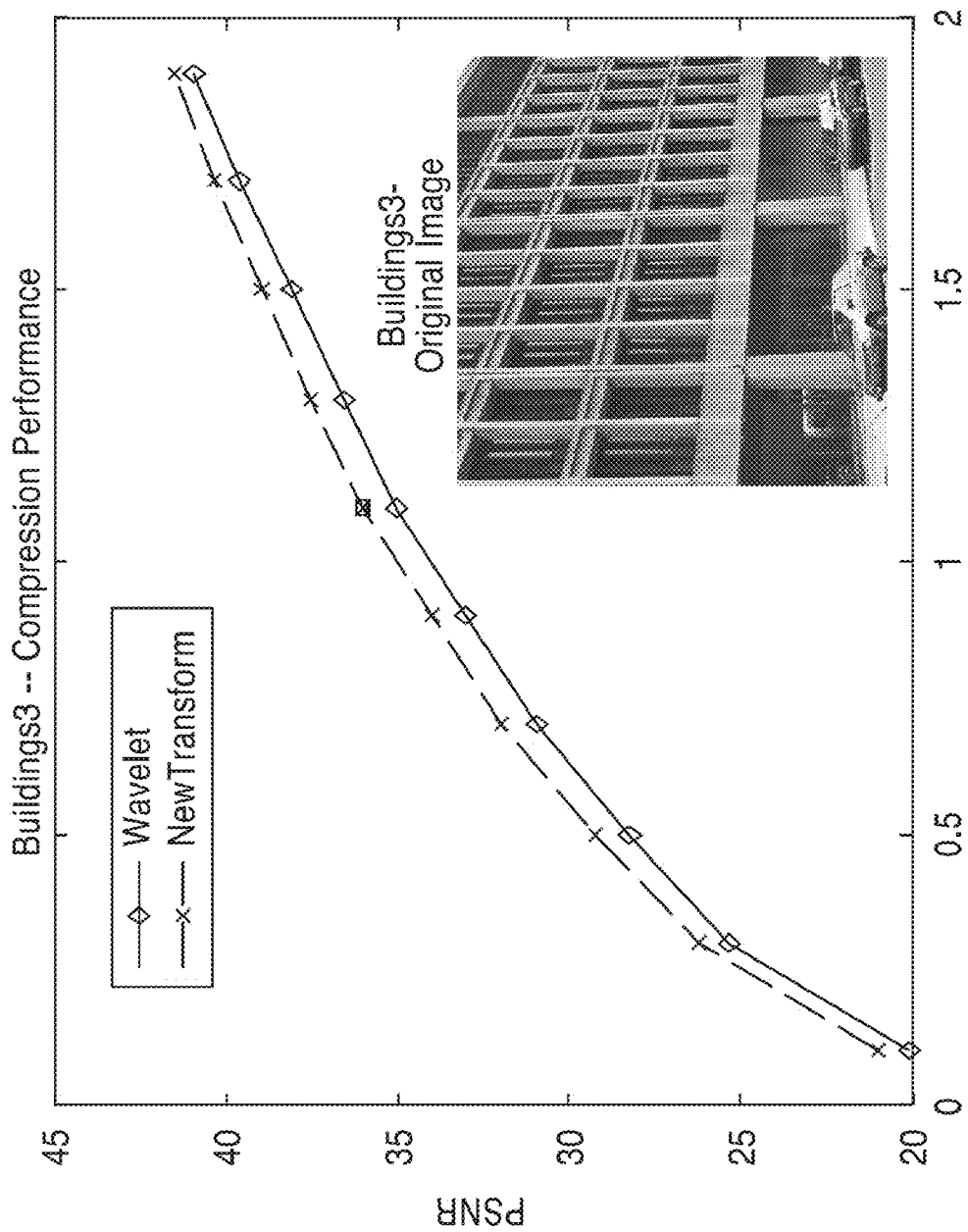
FIG. 21 is a graph of compression performance on a "Buildings3" image (inset) for a new directional transform according to an embodiment of the present invention as compared with a wavelet transform.
Figure 22:
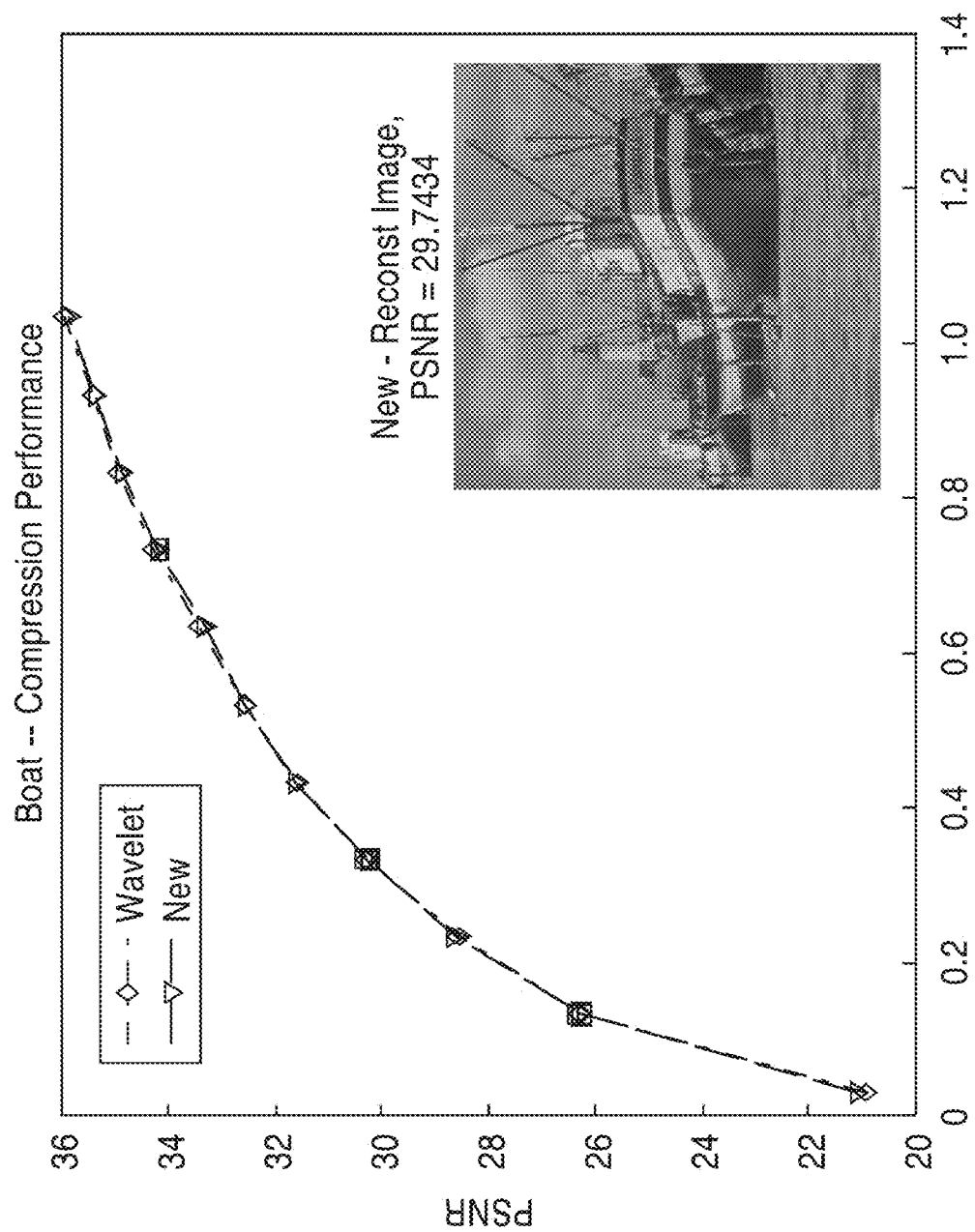
FIG. 22 is a graph of compression performance on a "Boat" image (inset) for a new directional transform according to an embodiment of the present invention as compared with a wavelet transform.

FIGS. 20-22 are graphs comparing the performance of wavelet transform coding with respect to the new diamond transform taught herein, as applied to an image referred to as "zoneplate" in FIG. 20, "buildings3" in FIG. 21 and "Boat" in FIG. 22. The horizontal axis represents bps, which is bits per sample, or bits per pixel.

Accordingly, the present invention provides methods and apparatus for increasing image coding efficiency. Inventive teachings can be applied in a variety of image based apparatus and applications, including still and video camera imaging systems, and so forth. As can be seen, therefore, the present invention includes the following inventive embodiments among others:

1. An apparatus for image encoding, comprising: a computer configured for receiving image data; memory coupled to said computer; and programming executable on said computer for performing steps comprising: executing transforms on received image data into the frequency domain to generate transform coefficients within a tree a plurality of subbands; scanning of subband pairs within the in a desired order; determining if a zero-tree exists at the same spatial location in at least two subbands; and generating a ring-tree symbol within the encoded image in response to determining that a ring of zero-trees exists.

2. An apparatus according to embodiment 1, wherein said coding is performing first on the directional subbands containing the highest energy.

3. An apparatus according to embodiment 1, wherein said plurality of subbands has lowest frequency coefficients at a subband at a root node and spatially related coefficients at higher frequency subbands of the tree.

4. An apparatus according to embodiment 1, further comprising selecting a scanning pattern between horizontal and vertical scanning in response to which yields the most compact encoding.

5. An apparatus according to embodiment 1, further comprising detecting a zero-tree condition, and generating an associated symbol, if no ring of zero-trees exists and yet a coefficient and all its descendants are insignificant.

6. An apparatus according to embodiment 1, further comprising detecting an isolated zero condition and generating an associated symbols, when no ring of zero-trees is determined, and yet a coefficient itself is found to be insignificant.

7. An apparatus according to embodiment 1, wherein said spatial locations comprise (HL1, HL2), or (LH1, LH2), or (HH1, HH2).

8. An apparatus according to embodiment 1, wherein coding in response to determining a ring of zero-trees is performed in response to a coding of received image data selected from the set of image data encoding techniques consisting of the use of wavelet transforms, embedded zero-tree wavelet (EZW), and Diamond transforms.

9. An apparatus for image encoding, comprising: a computer configured for receiving image data as received image data; memory coupled to said computer; and programming executable on said computer for performing steps comprising: executing a transform on the received image data; partitioning the energy of an image input into directional subbands of horizontal and vertical component energy in response to the diamond shape frequency response of the input; and applying a Quincunx filter bank having a combination of fan filters and shifter filters for each directional subband.

10. An apparatus according to embodiment 9, wherein said transform comprises executing a transform on the received image data.

11. An apparatus according to embodiment 9, wherein said fan filters and shifter filters are utilized in combination with Q-fold downsamplers.

12. An apparatus according to embodiment 9, wherein said subbands comprise four combination of horizontal and vertical energy Low-Low (LL), Low-High (LH), High-Low (HL) and High-High (HH).

13. An apparatus according to embodiment 9, wherein said Low-Low (LL) subband iteratively passes through the Quincunx filter bank.

14. An apparatus according to embodiment 9, wherein said shifter filter comprises a modulation of the fan filter function.

15. An apparatus according to embodiment 9, wherein said Quincunx filter bank divides each said subband into at least a first and second output.

16. An apparatus for image encoding, comprising: a computer configured for receiving image data as received image data; memory coupled to said computer; and programming executable on said computer for performing steps comprising: executing a transform on the received image data; partitioning the energy of an image input into directional at least four subbands of horizontal and vertical component energy in response to the diamond shape frequency response of the input; and applying a Quincunx filter bank having a combination of fan filters and shifter filters, utilized in combination with Q-fold downsamplers, dividing each directional subband into at least a first and second output.

17. An apparatus according to embodiment 16, wherein said transform comprises executing a wavelet transform on the received image data.

18. An apparatus according to embodiment 16, wherein said subbands comprise four combination of horizontal and vertical energy Low-Low (LL), Low-High (LH), High-Low (HL) and High-High (HH).

19. An apparatus according to embodiment 16, wherein said Low-Low (LL) subband iteratively passes through the Quincunx filter bank.

20. An apparatus according to embodiment 16, wherein said received image data is associated with a still image or video frames.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for image encoding, comprising:
a computer configured for receiving image data as received image data;
memory coupled to said computer; and programming executable on said computer for performing steps comprising:

executing a transform on the received image data;

partitioning the energy of an image input into directional subbands of horizontal and vertical component energy in response to the diamond shape frequency response of the input;

wherein said directional subbands comprise four directional subbands, which are combinations of horizontal and vertical energy, as regions Low-Low (LL), Low-High (LH), High-Low (HL) and High-High (HH); and applying a Quincunx filter bank, having a combination of fan filters and shifter filters for three of said four directional subbands, in which frequency is partitioned in horizontal and vertical directions with sub-divided outputs in regions Low-High (LH), High-Low (HL) and High-High (HH);

said Quincunx filter having six channel filter banks Low-High1 (LH1), Low-Hiqh2 (LH2), High-Low1 (HL1), Hiqh-Low2 (HL2), High-High1 (HH1), and High-High2 (HH2) utilized in said transform, with a Low-Low (LL) subband iteratively processed through the six channel filter banks.

2. An apparatus as recited in claim 1, wherein said transform comprises executing a frequency transform on the received image data.

3. An apparatus as recited in claim 1, wherein said fan filters and shifter filters are utilized in combination with Q-fold downsamplers.

4. An apparatus as recited in claim 1, wherein said shifter filter comprises a modulated version of the fan filter function.

5. An apparatus as recited in claim 1, wherein said Quincunx filter bank divides each said subband into at least a first and second output.

6. An apparatus for image encoding, comprising:

a computer configured for receiving image data as received image data;

memory coupled to said computer; and programming executable on said computer for performing steps comprising:

executing a transform on the received image data;

partitioning the energy of an image input into directional at least four subbands of horizontal and vertical component energy in response to the diamond shape frequency response of the input;

wherein said directional subbands comprise four directional subbands, which are combinations of horizontal and vertical energy, as regions Low-Low (LL), Low-High (LH), High-Low (HL) and High-High (HH); and applying a Quincunx filter bank having a combination of fan filters and shifter filters, utilized in combination with Q-fold downsamplers, dividing three of said four directional subbands into at least a first and second output, in which frequency is partitioned in the horizontal and vertical directions with sub-divided outputs in regions Low-High (LH), High-Low (HL) and High-High (HH)

said Quincunx filter having six channel filter banks Low-High1 (LH1), Low-Hiqh2 (LH2), High-Low1 (HL1), Hiqh-Low2 (HL2), High-High1 (HH1), and High-High2 (HH2) utilized in said transform, with a Low-Low (LL) subband iteratively processed through the six channel filter banks.

7. An apparatus as recited in claim 6, wherein said transform comprises executing a wavelet transform on the received image data.

8. An apparatus as recited in claim 6, wherein said received image data is associated with a still image or video frames.

\* \* \* \* \*